(12) United States Patent
Dalrymple et al.

(10) Patent No.: US 11,409,100 B2
(45) Date of Patent: *Aug. 9, 2022

(54) TECHNIQUES FOR IMPROVING A FIBER SCANNING SYSTEM

(71) Applicant: Magic Leap, Inc., Plantation, FL (US)

(72) Inventors: Timothy Mark Dalrymple, Gainesville, FL (US); Alejandro Lopez, Pembroke Pines, FL (US); William K. Jones, Jr., Fort Lauderdale, FL (US); Andrew C. Duenner, Houston, TX (US)

(73) Assignee: Magic Leap, Inc., Plantation, FL (US)

( * ) Notice: Subject to any disclaimer, the term of this patent is extended or adjusted under 35 U.S.C. 154(b) by 31 days.

This patent is subject to a terminal disclaimer.

(21) Appl. No.: 16/935,809

(22) Filed: Jul. 22, 2020

(65) Prior Publication Data

US 2020/0348511 A1 Nov. 5, 2020

Related U.S. Application Data

(63) Continuation of application No. 16/675,074, filed on Nov. 5, 2019, now Pat. No. 10,775,611, which is a
(Continued)

(51) Int. Cl.
*G02B 26/10* (2006.01)
*H04N 7/22* (2006.01)

(52) U.S. Cl.
CPC ............. *G02B 26/103* (2013.01); *H04N 7/22* (2013.01)

(58) Field of Classification Search
CPC .......... G02B 26/10; G02B 26/103; H04N 7/22
See application file for complete search history.

(56) References Cited

U.S. PATENT DOCUMENTS

| 5,450,192 A | 9/1995 | Nolf et al. |
| 6,845,190 B1 | 1/2005 | Smithwick et al. |

(Continued)

FOREIGN PATENT DOCUMENTS

| CN | 103142201 A | 6/2013 |
| CN | 106170729 A | 11/2016 |

(Continued)

OTHER PUBLICATIONS

U.S. Appl. No. 15/920,263, "Final Office Action", dated Apr. 30, 2019, 15 pages.
(Continued)

*Primary Examiner* — Daniel Petkovsek
(74) *Attorney, Agent, or Firm* — Kilpatrick Townsend & Stockton LLP (57) ABSTRACT

A fiber scanning system includes an actuator configured to have an actuator natural frequency, and a fiber optic scanning element coupled to the actuator. The fiber optic scanning element is configured to have a fiber natural frequency that is within a threshold of the actuator natural frequency, such that a displacement gain of the fiber optic scanning element as a function of operating frequency exhibits a first peak value at a first resonance frequency less than the fiber natural frequency, and a second peak value at a second resonance frequency greater than the fiber natural frequency.

17 Claims, 11 Drawing Sheets

Related U.S. Application Data continuation of application No. 15/920,263, filed on Mar. 13, 2018, now Pat. No. 10,502,948.

(60) Provisional application No. 62/471,913, filed on Mar. 15, 2017.

(56) References Cited

U.S. PATENT DOCUMENTS

| | | | |
|---|---|---|---|
| 7,558,455 B2 | 7/2009 | Weir et al. | |
| 7,616,986 B2 | 11/2009 | Seibel et al. | |
| 10,502,948 B2 * | 12/2019 | Dalrymple | H04N 7/22 |
| 10,775,611 B2 * | 9/2020 | Dalrymple | H04N 7/22 |
| 2001/0055462 A1 | 12/2001 | Seibel | |
| 2002/0064341 A1 | 5/2002 | Fauver et al. | |
| 2008/0058629 A1 | 3/2008 | Seibel et al. | |
| 2009/0028407 A1 | 1/2009 | Seibel et al. | |
| 2009/0177042 A1 | 7/2009 | Johnston | |
| 2009/0288479 A1 | 11/2009 | Woody et al. | |
| 2009/0316116 A1 | 12/2009 | Melville et al. | |
| 2011/0125029 A1 | 5/2011 | Wang et al. | |
| 2013/0235440 A1 | 9/2013 | Takeda et al. | |
| 2014/0247454 A1 | 9/2014 | Bhagavatula et al. | |
| 2014/0296639 A1 | 10/2014 | Sakai | |
| 2015/0205126 A1 | 7/2015 | Schowengerdt | |
| 2016/0324403 A1 | 11/2016 | Yeoh et al. | |
| 2020/0073114 A1 | 3/2020 | Dalrymple et al. | |

FOREIGN PATENT DOCUMENTS

| | | | |
|---|---|---|---|
| DE | 19620192 A1 | 11/1997 | |
| JP | 2008514342 A | 5/2008 | |
| JP | 2011055015 A | 3/2011 | |
| JP | 5069105 B2 | 11/2012 | |
| JP | 2014147462 A | 8/2014 | |
| WO | 2016157249 A1 | 10/2016 | |
| WO | 2016189627 A1 | 12/2016 | |

OTHER PUBLICATIONS

U.S. Appl. No. 15/920,263, "Non-Final Office Action", dated Jan. 23, 2019, 16 pages.
U.S. Appl. No. 15/920,263, "Notice of Allowance", dated Aug. 19, 2019, 9 pages.
U.S. Appl. No. 16/675,074, "Non-Final Office Action", dated Dec. 31, 2019, 9 pages.
U.S. Appl. No. 16/675,074, "Notice of Allowance", dated May 20, 2020, 11 pages.
CN201880017818.0, "Office Action", English Translation, dated Feb. 20, 2021, 13 pages.
EP18768182.0, "Extended European Search Report", dated Feb. 14, 2020, 13 pages.
JP2019-550228, "Office Action", no English Translation available, dated Apr. 5, 2021, 2 pages.
KR10-2019-7029284, "Office Action", o English Translation available, dated Apr. 30, 2021, 9 pages.
PCT/US2018/022254, "International Preliminary Report on Patentability", dated Sep. 26, 2019, 9 pages.
PCT/US2018/022254, "International Search Report and Written Opinion", dated Jul. 2, 2018, 11 pages.
Application No. CN201880017818.0, English Translation and Office Action, dated Sep. 22, 2021, 10 pages.
IN201947032466, "First Examination Report", dated Sep. 7, 2021, 8 pages.
Application No. JP2019-550228, English Translation and Office Action, dated Aug. 31, 2021, 6 pages.
Application No. KR10-2019-7029284, English Translation and Office Action, dated Sep. 1, 2021, 9 pages.
Application No. EP18768182.0, Office Action, dated Dec. 17, 2021, 5 pages.
Application No. KR10-2019-7029284, Notice of Decision to Grant and English Translation, dated Jan. 11, 2022, 3 pages.
Application No. AU2018235784, "First Examination Report", dated May 31, 2022, 2 pages.
Application No. KR10-2022-7011320, Office Action and English Translation, dated Jun. 2, 2022, 11 pages.

* cited by examiner

Provide an actuator characterized by an actuator natural frequency of operation
610

↓

Provide a fiber optic scanning element that couples to the actuator
620

↓

Drive the actuator at an operating frequency
630

FIG. 6

TECHNIQUES FOR IMPROVING A FIBER SCANNING SYSTEM

CROSS-REFERENCES TO RELATED APPLICATIONS

This application is a continuation application of U.S. patent application Ser. No. 16/675,074, filed Nov. 5, 2019, now U.S. Pat. No. 10,775,611, issued Sep. 15, 2020 entitled "TECHNIQUES FOR IMPROVING A FIBER SCANNING SYSTEM," which is a continuation application of U.S. patent application No. 15/920,263, filed on Mar. 13, 2018, now U.S. Pat. No. 10,502,948, issued Dec. 10, 2019, entitled "TECHNIQUES FOR IMPROVING A FIBER SCANNING SYSTEM," which claims priority to U.S. Provisional Patent Application No. 62/471,913, filed on Mar. 15, 2017, entitled "DYNAMIC ABSORBER MODE FIBER SCANNER", the disclosures of which are hereby incorporated by reference in their entirety for all purposes.

BACKGROUND

An image projector can be an optical device that projects an image (or moving images) for a user to view. Recently, innovations have allowed a head-mounted device to include an image projector. Such image projectors can project images to the eyes of a user wearing the head-mounted device. However, image projectors small enough to be used with a head-mounted device typically project an image with a narrow field of view. Therefore, there is a need in the art for an improved design for an image projector to use with a head-mounted device.

SUMMARY

Provided are methods, systems, and computer-program products for an improved design of a fiber scanning system. For example, the performance of the fiber scanning system can be optimized by substantially matching the natural frequencies of the fiber scanning system's actuator and fiber optic scanning element. By matching the natural frequencies, the fiber scanning system can increase the maximum distance that the tip of the fiber optic scanning element may be driven relative to a resting position of the fiber optic scanning element. Such an effect may be produced because matching the natural frequencies of the fiber scanner allows for larger amplitudes to be achieved. It should be noted that the natural frequency of the scanning system can be selected to avoid excitation frequencies that could destabilize the system. In this way, the system as a whole may act as a tuned dynamic absorber or a modal energy transfer optimizer for an oscillator, thereby improving scan performance while maintaining a stable scanning system.

According to an embodiment of the present invention, a method for increasing a field of view of a fiber scanning system is provided. The method includes configuring a fiber scanning system to behave as a tuned dynamic absorber by selecting (1) an actuator characterized by a first actuator natural frequency and (2) a fiber optic scanning element characterized by a first fiber natural frequency that is within a threshold of the first actuator natural frequency. Alternatively, the method includes configuring a fiber scanning system to behave as a tuned dynamic absorber by selecting (1) a fiber optic scanning element characterized by a second fiber natural frequency and (2) an actuator characterized by a second actuator natural frequency that is within a threshold of the second actuator natural frequency. The method also includes driving the fiber scanning system at an operating frequency.

According to another embodiment, a method for increasing a field of view of a fiber scanning system is provided. The method includes configuring the fiber scanning system to behave as a tuned dynamic absorber by: providing (1) an actuator characterized by an actuator natural frequency and (2) a fiber optic scanning element characterized by a fiber natural frequency that is within a threshold of the actuator natural frequency. A first displacement gain is associated with operation of the fiber scanning system at the fiber natural frequency. The method also includes determining a range of operating frequencies. The range extends from a first operating frequency less than the fiber natural frequency and associated with the first displacement gain to a second operating frequency greater than the fiber natural frequency and associated with the first displacement gain. The method further includes driving the actuator at an operating frequency within the range.

In some examples, the fiber scanning system can include an actuator (e.g., a piezoelectric tube) and a fiber optic scanning element. In such examples, the fiber scanning system can be optimized such that an actuator natural frequency (of the actuator) can be determined to match a fiber natural frequency (of the fiber optic scanning element). In this manner, energy from the actuator can be more efficiently transferred to the fiber optic scanning element, increasing an overall deflection of the fiber optic scanning element, which can provide a wider field of view for the fiber scanning system.

Numerous benefits are achieved by way of the present disclosure over conventional techniques. For example, embodiments of the present disclosure provide an increased deflection of a tip of a fiber optic scanning element for a given energy input, increasing a field of view of a scanning fiber system.

Provided is a fiber scanning system. For example, a fiber scanning system can include an actuator (e.g., a piezoelectric tube) characterized by an actuator natural frequency of operation and a fiber optic scanning element coupled to the actuator. In some examples, the fiber optic scanning element can be characterized by a fiber natural frequency that is determined to match the actuator natural frequency. In examples with a piezoelectric tube, the piezoelectric tube can have a cylindrical geometry having a central axis, where the fiber optic scanning element passes through the piezoelectric tube along the central axis.

In some examples, one or more attributes of the actuator can be configured to produce the actuator natural frequency of operation. In such examples, an attribute of the one or more attributes can be Young's Modulus, second moment of area, density, area of the cross section, length, or a mode constant.

In some examples, the actuator natural frequency and the fiber natural frequency can match within a threshold (e.g., 10 percent). In such examples, the actuator natural frequency of operation can characterize the actuator when the fiber optic scanning element is separate from the actuator.

Also provided is a method for increasing the field of view for a fiber scanning system. For example, the method can include providing an actuator characterized by an actuator natural frequency of operation. In some examples, the fiber scanning system can include the actuator. The method can further include providing a fiber optic scanning element that couples to the actuator. In some examples, the fiber optic scanning element can be characterized by a fiber natural frequency that is determined to match the actuator natural frequency. In such examples, the fiber scanning system can further include the fiber optic scanning element. The method can further include driving the actuator at an operating frequency.

In some examples, a displacement gain of the fiber scanning system can be characterized by two split frequency peaks bounding the actuator natural frequency. In such examples, the operating frequency can be near (i.e., at a frequency within a threshold of) a first peak of the frequency peaks, where the first peak is less than the actuator natural frequency. In other examples, the operating frequency can be near (i.e., at a frequency within a threshold of) a second peak of the frequency peaks, where the second peak is more than the actuator natural frequency. In other examples, the operating frequency can be near (i.e. at a frequency within a threshold of) the actuator natural frequency. In some examples, the actuator can be driven by a sinusoidal voltage.

BRIEF DESCRIPTION OF THE DRAWINGS

Illustrative embodiments are described in detail below with reference to the following figures.

DETAILED DESCRIPTION

In the following description, for the purposes of explanation, specific details are set forth in order to provide a thorough understanding of embodiments of this disclosure. However, it will be apparent that various embodiments may be practiced without these specific details. The figures and description are not intended to be restrictive.

The ensuing description provides exemplary embodiments only, and is not intended to limit the scope, applicability, or configuration of this disclosure. Rather, the ensuing description of the exemplary embodiments will provide those skilled in the art with an enabling description for implementing an exemplary embodiment. For example, while the description might describe a piezoelectric tube, it should be recognized that any type of actuator can be used. It should also be understood that various changes may be made in the function and arrangement of elements without departing from the spirit and scope of the disclosure as set forth in the appended claims.

An image projector can be an optical device that projects an image (or moving images) for a user to view. In some examples, the image projector can project an image in the form of light into one or more eyes of a user. In such examples, the image projector can be in the form of one or more fiber scanning systems, which can each project light, using a fiber optic scanning element and an actuator, in various patterns (e.g., raster scan, spiral scan, Lissajous, or the like) into the one or more eyes of the user. In addition to projecting light, the fiber scanning system can receive emitted light. In particular, the same fiber scanning system that projects light may be used to receive light.

Figure 1:
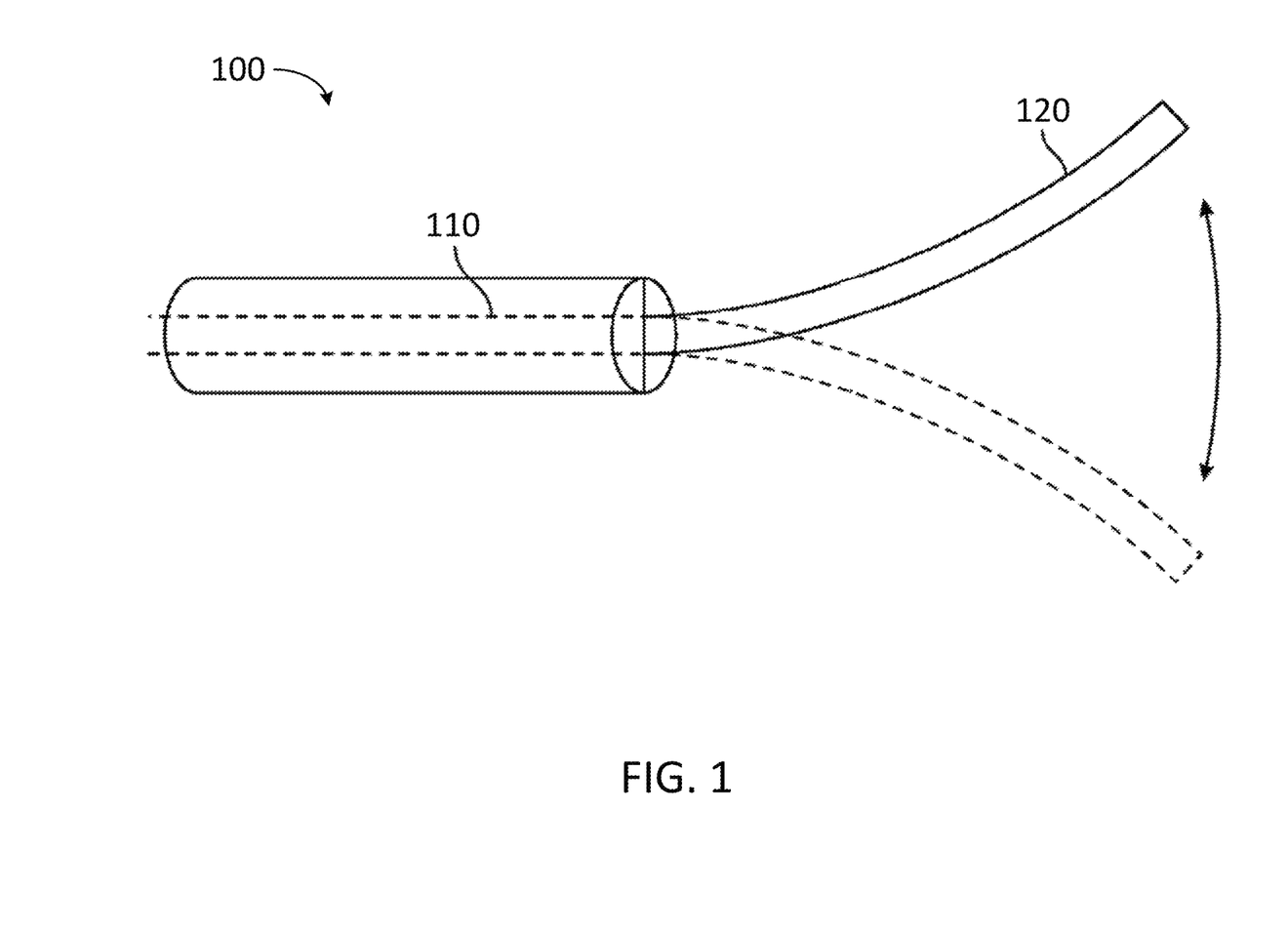
FIG. 1 illustrates an example of a fiber scanning system according to an embodiment of the present disclosure.

FIG. 1 illustrates an example of a fiber scanning system 100 according to an embodiment of the present disclosure. The fiber scanning system 100 can include an actuator 110 (such as a piezoelectric tube) and a fiber optic scanning element 120 (e.g., a single fiber or a multicore fiber optic scanning element). In some examples, the actuator 110 can be coupled to the fiber optic scanning element 120, causing the fiber optic scanning element 120 to be cantilevered. In such examples, the actuator 110 may be used to scan (or move) a tip of the fiber optic scanning element 120 for projecting light to one or more eyes of a user.

Figure 2:
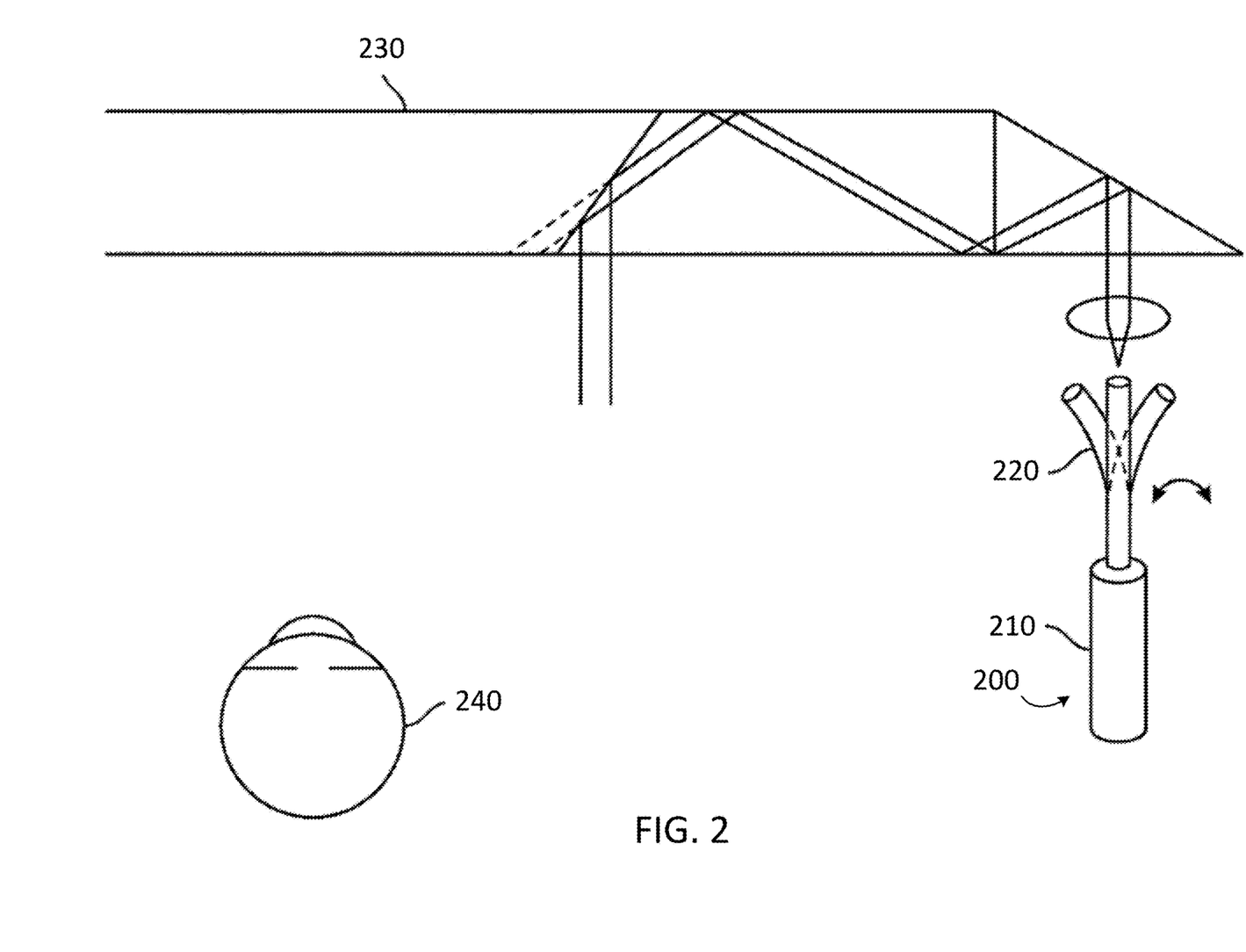
FIG. 2 illustrates an example of an image projector using a fiber scanning system according to an embodiment of the present disclosure.

FIG. 2 illustrates an example of an image projector using a fiber scanning system 200 according to an embodiment of the present disclosure. In some examples, the fiber scanning system 200 can include an actuator 210 (which can correlate with the actuator 110 in FIG. 1) and a fiber optic scanning element 220 (which can correlate with the fiber optic scanning element 120 in FIG. 1). In such examples, the fiber optic scanning element 220 can be scanned by the actuator 210 to create a set of beamlets with a plurality of angles of incidence and points of intersection that are relayed to an eye 240 by a waveguide 230. For example, a collimated light field image can be injected into the waveguide 230 to be translated to the eye 240.

Figure 3:
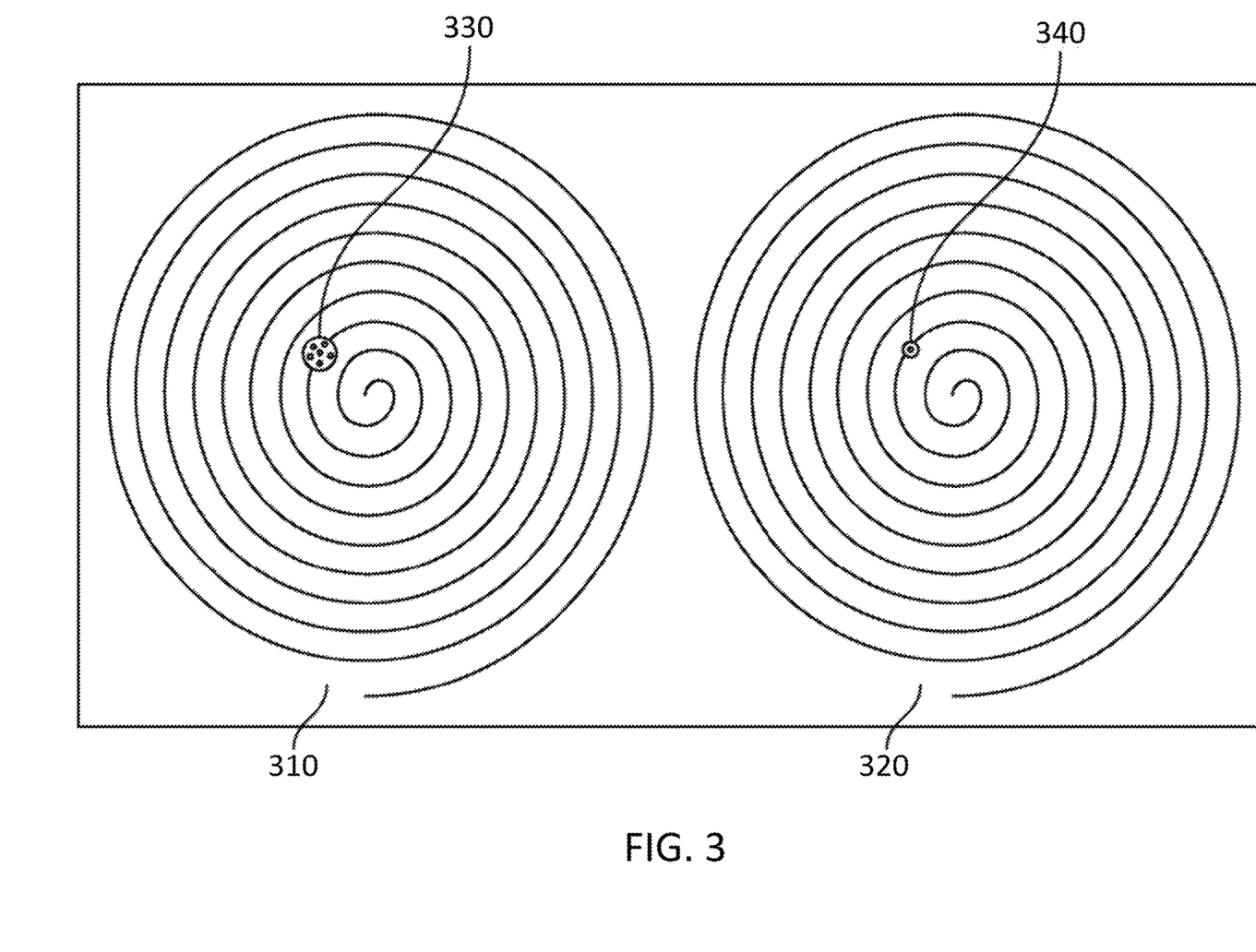
FIG. 3 illustrates an example of a spiral pattern formed by a moving fiber scanning system according to an embodiment of the present disclosure.

FIG. 3 illustrates an example of a spiral pattern formed by a moving fiber scanning system according to an embodiment of the present disclosure. In particular, spiral 310 illustrates a multicore fiber optic scanning element 330 and spiral 320 illustrates a single fiber optic scanning element 340. In some examples, a constant pattern pitch can provide for a uniform display resolution. In such examples, a pitch can be a distance between successive spiral passes along a common vector from an origin of the multicore fiber optic scanning element 330.

Figure 4A:
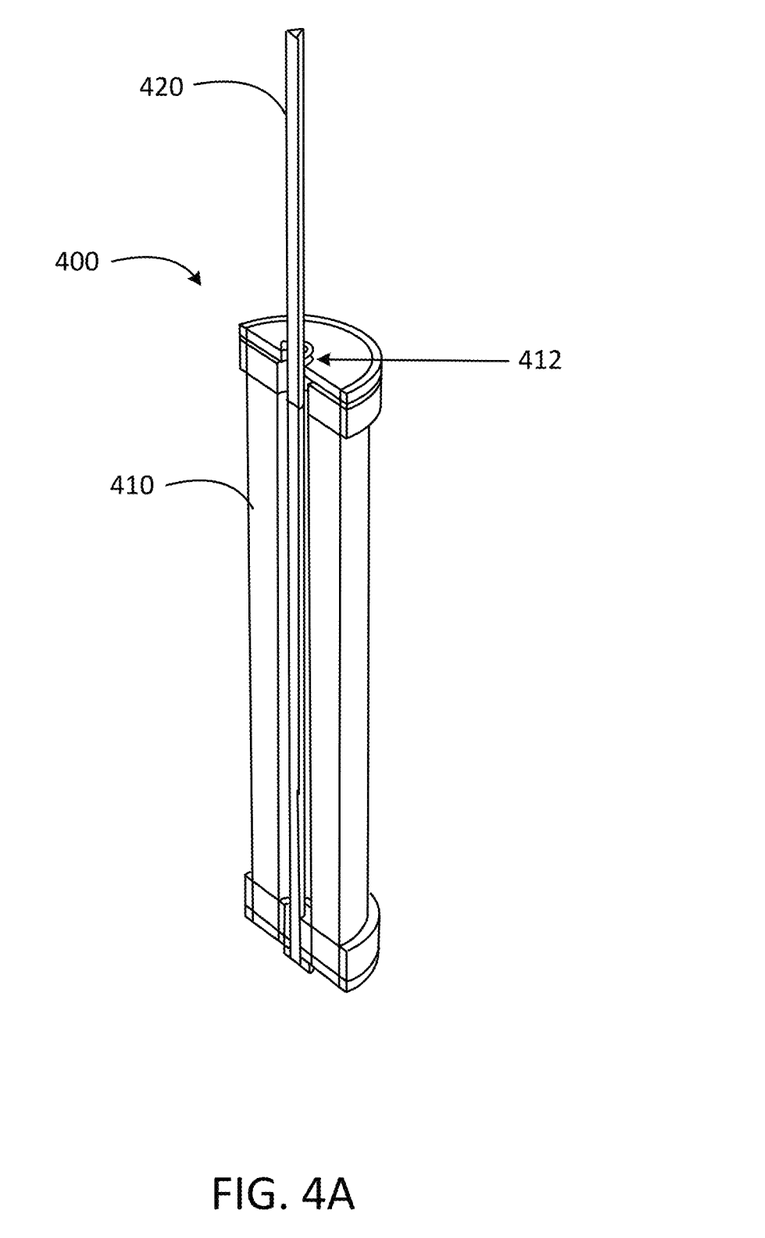
FIG. 4A illustrates an example of a cross section of a dynamic absorption design for a fiber scanning system according to an embodiment of the present disclosure.

FIG. 4A illustrates an example of a cross section of a dynamic absorption design for a fiber scanning system 400 according to an embodiment of the present disclosure. The fiber scanning system 400 can include an actuator 410 (which can correlate with the actuator 110 in FIG. 1). The fiber scanning system 400 can also include a fiber optic scanning element 420 (which can correlate with the fiber optic scanning element 120 in FIG. 1). As described below, the fiber optic scanning element 420 can be utilized as a scanning fiber of a fiber scanning display system.

In FIG. 4A, the actuator of the fiber scanning system is implemented as a piezoelectric tube and, for purposes of clarity, the discussion herein utilizes the term piezoelectric tube, but it will be understood that embodiments of the present disclosure can utilize actuators other than piezoelectric tubes. For example, voice coil actuators, thermal actuators, electrostatic driven actuators, electromagnetic actuators, or the like can be used. Accordingly, the description of piezoelectric tubes should be understood to include description of the more general class of actuators and the present disclosure is not limited to actuators implemented as piezoelectric tubes.

In the example embodiment illustrated in FIG. 4A, the actuator 410 is characterized by a cylindrical geometry. In addition, the fiber optic scanning element 420 passes through the actuator 410 along the central axis of the fiber optic scanning element 420 and is mechanically coupled to the actuator 410 at a central position 412. Although the fiber optic scanning element 420 is coupled to the actuator 410 at the central position 412, i.e., at a radial position of zero radius, this is not required by the present disclosure and other coupling positions can be utilized according to embodiments of the present disclosure. Therefore, it should be recognized that the fiber optic scanning element 420 can couple to other locations of the actuator 410. In some examples, the fiber optic scanning element 420 can couple to the actuator 410 using epoxy.

In some examples, the fiber scanning system 400 can further include an intermediate element between the fiber optic scanning element 420 and the actuator 410. In such examples, the intermediate element may be a fused silica ferrule or a microfabricated (e.g., fused silica or single crystal silicon) joint.

In some examples, an outside diameter of the fiber optic scanning element 420 at the central position 412 and an inside diameter of the actuator 410 at the central position 412 can be the same. In other examples, the diameters can be different (i.e., the outside diameter can be smaller than the inside diameter. In such examples, a retention collar can be used to surround and contact the fiber optic scanning element 420.

In some examples, the fiber optic scanning element 420 can be coupled to the actuator 410 using epoxy, filled epoxy (e.g., carbon nanotubes, nanorubbers, graphene, nanosilica additives, or the like), solder glass, solder, any adhesive, or the like.

In some examples, the actuator 410 can have a natural frequency (sometimes referred to as an actuator natural frequency or an eigenfrequency) based on one or more attributes of the actuator 410 (as described below). The actuator natural frequency can be described as a frequency with which the actuator 410 oscillates without external forces is left to vibrate on its own after an initial disturbance (as described in Mechanical Vibrations, Third Addition, pg. 53, Rao S.S., Addison-Wesley Publishing Company, New York 1995). In some examples, the actuator natural frequency is characteristic of the actuator 410 separate from the fiber optic scanning element 420.

Figure 4B:
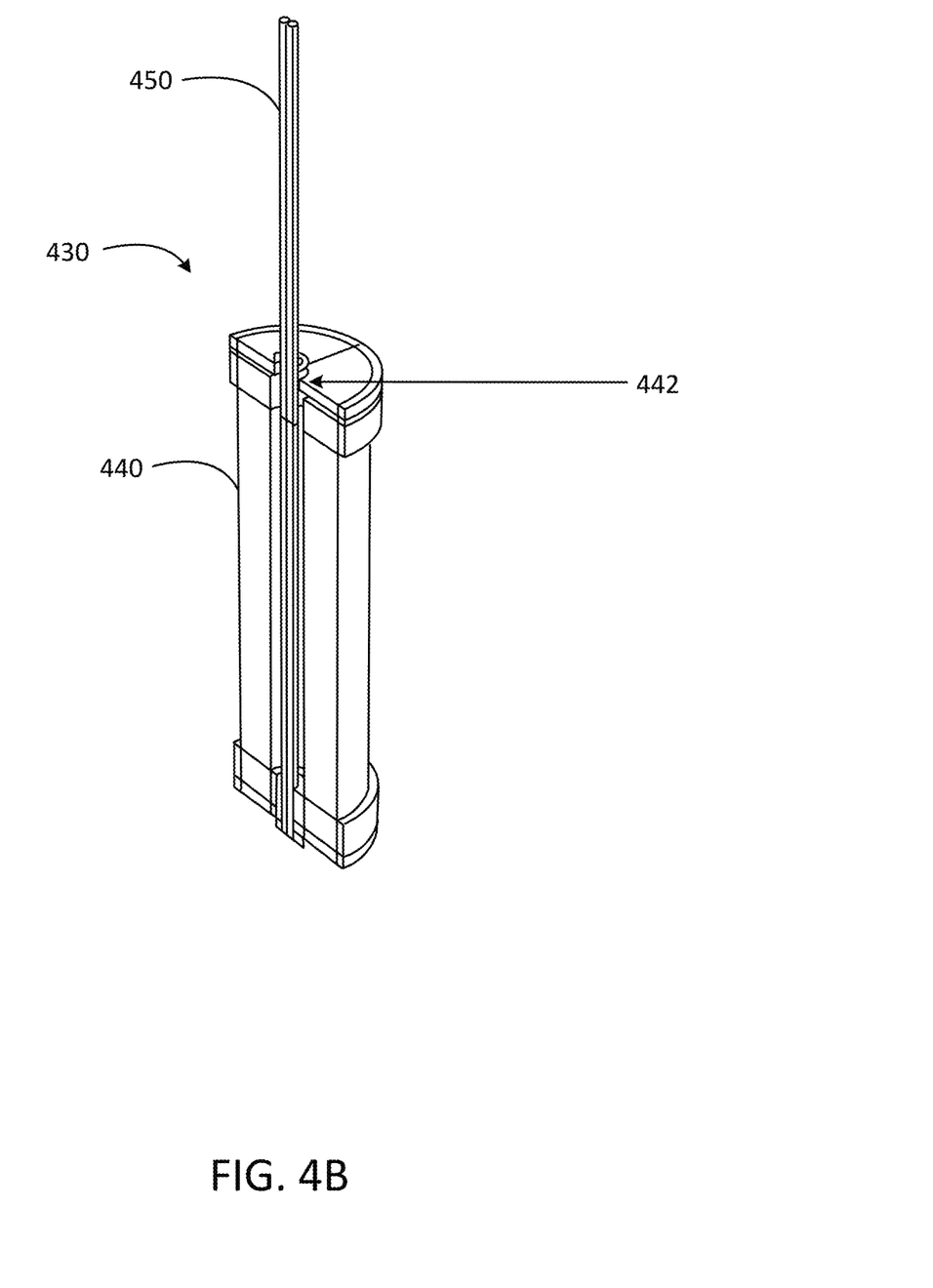
FIG. 4B illustrates an example of a cross section of an alternative design for a fiber scanning system according to an embodiment of the present disclosure.

In some examples, the fiber optic scanning element 420 can also have a natural frequency (sometimes referred to as a fiber natural frequency). The fiber natural frequency (sometimes referred to as a fiber resonance frequency) can be a frequency at which the fiber optic scanning element 420 (independent of or separate from the actuator 410) tends to oscillate in the absence of any driving or damping force. The fiber natural frequency can be the same as or different than the actuator natural frequency. In some examples, the fiber natural frequency can be much less than the actuator natural frequency (as shown in FIG. 4B). In some examples, the fiber optic scanning element 420 can absorb more energy when the frequency of its oscillations matches the actuator natural frequency.

In some examples, the fiber scanning system 400 can be optimized such that the fiber natural frequency can be within a threshold (e.g., 10%) of the actuator natural frequency when the fiber optic scanning element 420 is separate or independent from the actuator 410. By matching the natural frequencies within the threshold, energy from the actuator 410 can be more efficiently transferred to the fiber optic scanning element 420, gaining a larger overall deflection of the fiber optic scanning element 420, which can result in a larger (or wider) field of view for an image. The equality between or the matching of the actuator natural frequency and the fiber natural frequency can enable efficient energy transfer from the actuator 410 to the fiber optic scanning element 420 as described herein. The equality or matching is discussed in relation to a threshold of 10%, but this is not required by the present disclosure. In some examples, the threshold is less than 10% (e.g., 5%, 2%, 1%, or the like). In other examples, the threshold is greater than 10% (e.g., 15%, 20%, or the like). One of ordinary skill in the art would recognize many variations, modifications, and alternatives.

As mentioned above, the actuator natural frequency can be based on one or more attributes of the actuator 410. In some examples, the one or more attributes can be adjusted such that the actuator natural frequency is determined to match (be within the threshold of) the fiber natural frequency. In such examples, the one or more attributes of the actuator 410 can include, but is not limited to: Young's Modulus, second moment of area, density, area of the cross section, length, and a mode constant. The actuator natural frequency can be expressed as:

$$f_n = \frac{1}{2\pi}(\beta L(i))^2 \sqrt{\frac{EI}{\rho A L^4}},$$

where $f_n$ can be a natural frequency of the actuator 410, $\beta$ can be a mode constant, L can be a length of the actuator 410, i can be an integer that represents the mode number, E can be Young's Modulus for the actuator 410, I can be a second moment of area for the actuator 410, $\rho$ can be a density of the actuator 410, and A can be an area of the cross section of the actuator 410. In some examples, the mode constant can be a function of boundary conditions, and the mode harmonic (e.g., first mode, second mode, etc.). Boundary conditions can be how the fiber optic scanning element is attached at its end. In some examples, the attachment can be fixed, indicating no rotation and no displacement at the fixed end. In other examples, the attachment can be simple, indicating no displacement with rotation allowed. In other examples, the attachment can be free support, indicating both rotation and displacement are allowed.

Figure 4C:
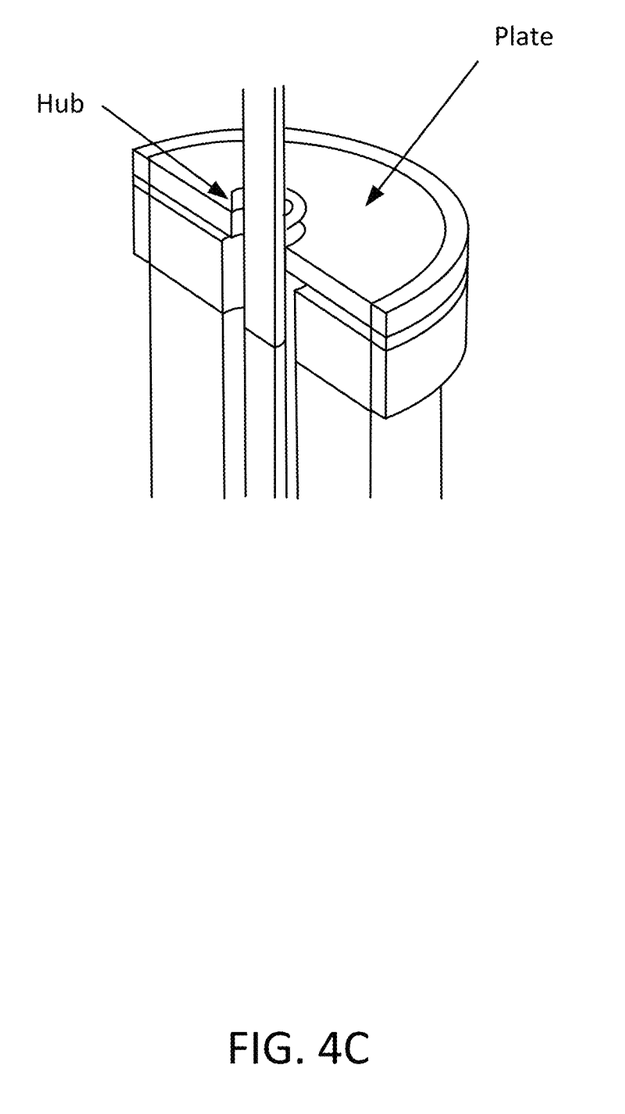
FIG. 4C illustrates an example of a cross section of a fiber scanning system indicating a hub and a plate.

In one illustrative example, the actuator natural frequency and the fiber natural frequency can each be approximately 25,000 hertz (Hz). In such an example, a length of the actuator 410 can be 3.903 millimeters (mm) and a length of the fiber optic scanning element 420 can be 1.970 mm. Other dimensions of the actuator 410 and the fiber optic scanning element 420 can include a piezo outer diameter (OD) (e.g., 888 micrometers (μm)), piezo inner diameter (ID) (e.g., 296 μm), diameter of the fiber optic scanning element 420 (e.g., 125 μm), joint flexure plate thickness (e.g., 70 μm) (plate is illustrated in FIG. 4C), joint flexure hub thickness (e.g., 40 μm) (hub is illustrated in FIG. 4C), and a nominal excitation voltage (e.g., 100 μm). However, it should be recognized that the dimensions and attributes can be different depending on the particular application and/or actuator.

In some examples, when the fiber optic scanning element 420 is added to the actuator 410 to form a fiber scanning system, the natural frequency of the fiber scanning system can be less than either the actuator natural frequency or the fiber natural frequency. For example, the natural frequency of the fiber scanning system can decrease with respect to the actuator natural frequency because of the added mass of the fiber optic scanning element 420. In some examples, when the fiber optic scanning element 420 is combined with the actuator 410, the natural frequency of the fiber scanning system can be function of a modal mass ratio of the fiber optic scanning element 420 and the actuator 410. In some examples, the modal mass ratio for the dynamic absorption design can be 1:1, where the actuator 410 has an equal modal mass to the fiber optic scanning element 420.

In some examples, the actuator 410 can be driven at a particular frequency or a particular range of frequencies, which can be referred to as an operating frequency. In such examples, the actuator 410 can be driven by a sinusoidal voltage. The operating frequency at which the actuator 410 is driven, can be such that the actuator 410 reduces its own movement. For example, the actuator 410 can be driven at its natural frequency. By minimizing movement of the actuator 410, energy can be stored by the actuator 410, which can then be transferred through reaction forces to the fiber optic scanning element 420 to gain a larger overall deflection of the fiber optic scanning element 420. Accordingly, embodiments of the present invention in which the actuator is driven at its natural frequency to produce an increased deflection of the fiber optic scanning element contrast sharply with conventional systems in which operating frequencies, particularly of tuned dynamic absorbers, differ significantly from resonant frequencies in order to reduce vibration. Rather than reducing oscillation (i.e., deflection) of the fiber optic scanning element, embodiments of the present invention increase the range of the deflection contrary to conventional system operation.

FIG. 4B illustrates an example of a cross section of an alternative design for a fiber scanning system according to an embodiment of the present disclosure. The alternative design can have different natural frequencies for an actuator 440 and a fiber optic scanning element 450. In particular, the actuator natural frequency can be approximately 50,000 Hz while the fiber natural frequency can be approximately 25,000 Hz (which is half of the actuator natural frequency). In some examples, a length of the actuator in an alternative design can be 2.767 mm and a length of the fiber optic scanning element 450 can be 1.970 mm. In some examples, the modal mass ratio for the alternative design can be 2:1, where the actuator 440 can have twice the modal mass of the fiber optic scanning element 450.

Figure 5A:
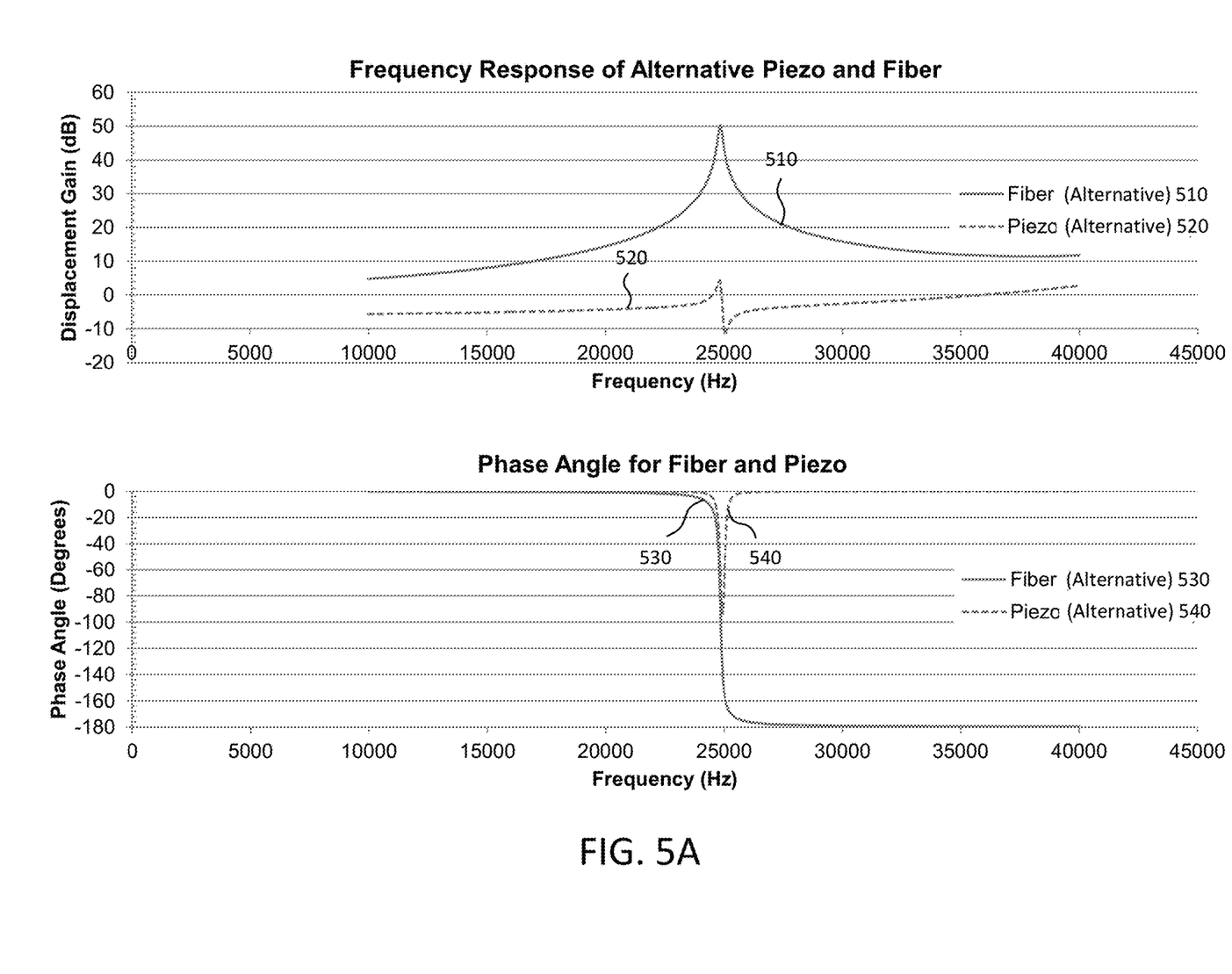
FIG. 5A illustrates an example of Bode plots for an alternative design for a fiber scanning system according to embodiments of the present disclosure.

FIG. 5A illustrates an example of Bode plots for an alternative design for a fiber scanning system according to an embodiment of the present disclosure. The Bode plots illustrated in FIG. 5A correlate with the alternative design of the fiber scanning system discussed in relation to FIG. 4B above in which a natural frequency of the fiber optic scanning element is half of a natural frequency of the actuator. The Bode plots in FIG. 5A can describe a frequency response and a phase angle for components (e.g., the actuator 440 and/or the fiber optic scanning element 450) of the fiber scanning system. In some examples, the Bode plots can be generated using one or more linear models. However, it should be recognized that the Bode plots may be generated using one or more non-linear models.

In particular, a first Bode plot can graph a displacement gain for an actuator (e.g., a piezoelectric tube plot 520) and a fiber optic scanning element (e.g., a fiber plot 510) in relation to a frequency applied to the actuator by a voltage. In some examples, the displacement gain can be in reference to a tip of the fiber optic scanning element and/or a tip of the actuator. In such examples, the displacement gain can be computed using the following equation:

$$\text{gain} = 20\log\left(\frac{\delta}{1}\right),$$

where δ refers to a dynamic value of the fiber scanning system and the 1 refers to an approximation of a static value of the fiber scanning system. In such examples, the static value can be normalized to 1, which can be an expected static deflection for the fiber scanning system. In some examples, a static value can be a displacement of an actuator when a direct current (DC) voltage potential is applied. In such examples, a position of the actuator may not change with time. In some examples, a dynamic value can be a displacement of the actuator when an alternating current (AC) voltage potential is applied.

Referring to the first Bode plot of FIG. 5A, the fiber plot 510 can indicate that a displacement gain of a tip of the fiber optic scanning element can increase until a frequency being applied to the actuator reaches a natural frequency (e.g., 25,000 Hz) of the fiber optic scanning element. In some examples, the displacement gain of the fiber optic scanning element can increase at a greater rate as the frequency approaches the fiber natural frequency. After the fiber plot 510 reaches the fiber natural frequency, the displacement gain of the tip of the fiber optic scanning element can decrease (e.g., asymptotically).

The piezoelectric tube plot 520 can indicate that a displacement gain of a tip of the actuator also increases until a frequency being applied to the actuator reaches the fiber natural frequency. In some examples, the frequency of the actuator can increase at a relatively linear rate on a logarithmic scale until the displacement gain of the fiber optic scanning element reaches a particular amount. Once the displacement gain of the fiber optic scanning element reaches a particular amount, more energy can be transferred from the actuator to the fiber optic scanning element, causing the displacement gain of the actuator to increase at a greater rate than before the displacement gain of the fiber optic scanning element reaches the particular amount. In some examples, energy transfer from the fiber optic scanning element to the actuator is not advantageous as the transfer of the reaction force of the fiber optic scanning element to the actuator decreases the displacement gain that the fiber optic scanning element can experience.

Once the frequency being applied to the actuator reaches the fiber natural frequency, the displacement gain of the actuator can drop to approximately −10, which can equal 20 $\log_{10}$ output/input, making the output/input equal to 0.31, indicating that a dynamic response is 31% of a static response. After the displacement gain of the actuator drops, the displacement gain of the actuator can increase to a particular amount (the rate of change of the amplitude of the displacement as a function of frequency may be dictated by an order of the linear system), and then continue to increase (at a rate similar to the rate before the particular amount described above) until the frequency being applied to the actuator reaches the actuator natural frequency (e.g., 50,000 Hz). After the frequency being applied to the actuator reaches the natural frequency of the actuator, the displacement gain of the actuator can decrease (e.g., asymptotically).

A second Bode plot can graph a phase angle for an actuator (e.g., a piezoelectric tube 540) and a fiber optic scanning element (a fiber plot 530) in relation to a frequency applied to the actuator by a voltage. The phase angle can indicate a relationship between a response of the actuator and the fiber optic scanning element to a frequency input. In some examples, the phase angle can indicate a time delay, typically between a command signal and a physical response. In such examples, the phase angle can indicate the controllability of the fiber scanning system.

Figure 5B:
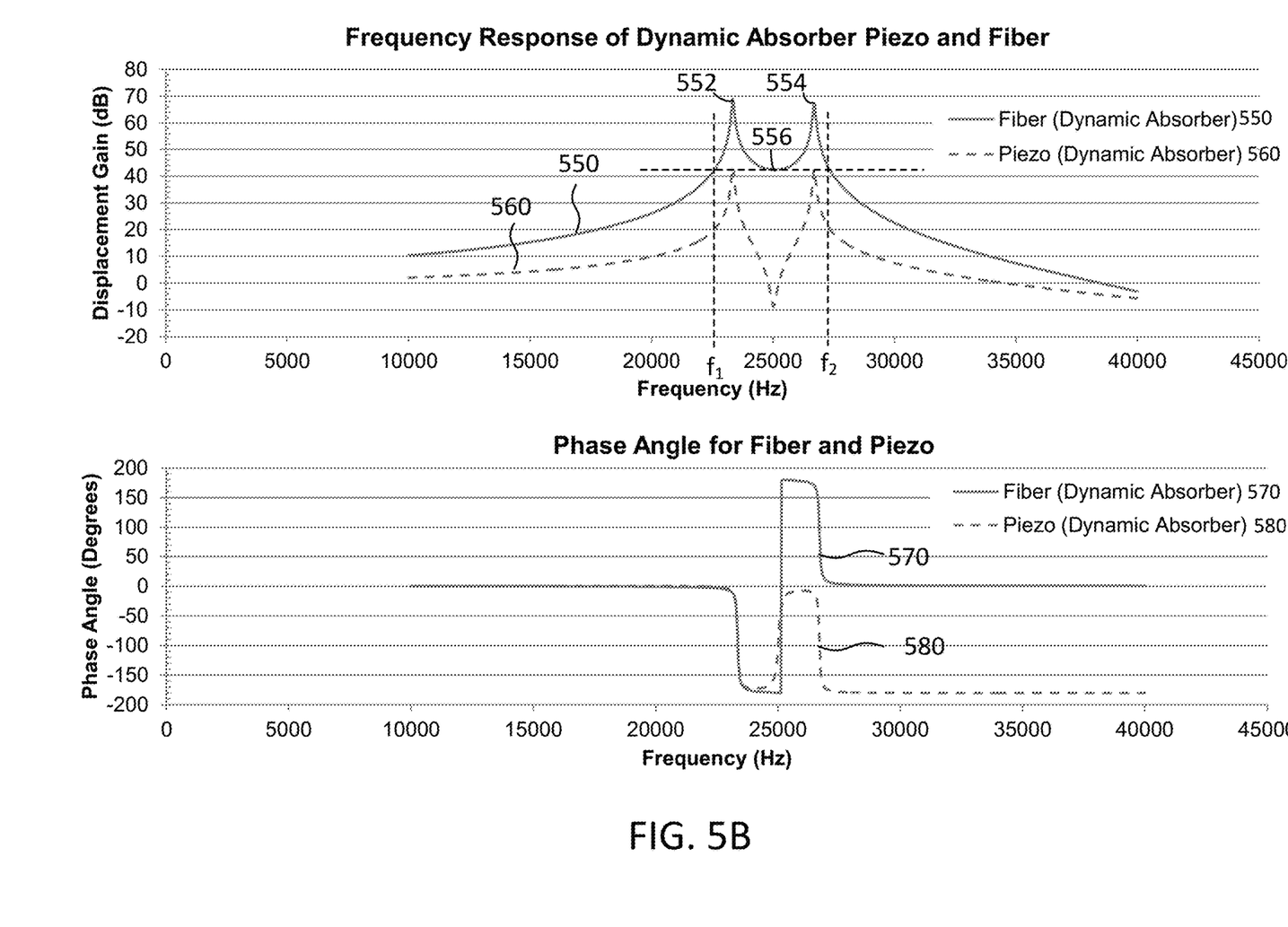
FIG. 5B illustrates an example of Bode plots for a dynamic absorption design for a fiber scanning system according to embodiments of the present disclosure.

FIG. 5B illustrates an example of Bode plots for a dynamic absorption design for a fiber scanning system (as illustrated in FIG. 4A above where a fiber natural frequency can be approximately matched to an actuator natural frequency) according to an embodiment of the present disclosure. Similar to as described above for FIG. 5A, the Bode plots can describe a frequency response and a phase angle for components (e.g., the actuator 410 and/or the fiber optic scanning element 420) of the fiber scanning system.

Referring to the first Bode plot of FIG. 5B, a fiber plot 550 can indicate that a displacement gain of a tip of the fiber optic scanning element can be characterized by two peaks in the fiber plot 550. The two peaks can represent a mode splitting that is caused by combining a fiber optic scanning element and an actuator together into a single mechanical system with both the fiber optic scanning element and the actuator having the same frequency. In particular, a first resonant mode of the actuator can be associated with a first peak (sometimes referred to as a first resonant frequency 552) formed at a frequency lower than the actuator natural frequency. In addition, a second resonant mode of the fiber optic scanning element can be associated with a second peak (sometimes referred to as a second resonant frequency 554) formed at a frequency higher than the fiber natural frequency.

In some examples, the displacement gain of the tip of the fiber optic scanning element can decrease between the first peak and the second peak as illustrated in FIG. 5B. The decrease in the displacement gain can cause the displacement gain of the tip of the fiber optic scanning element at the fiber natural frequency to be less than either of the peaks; however, the displacement gain, although decreased from the peak values, may still be higher than the displacement gain of the tip of the fiber optic scanning element of the alternative design at the fiber natural frequency (as illustrated in FIG. 5A). In some examples, a distance between the peaks in the fiber plot 550 can be a function of the modal mass ratio. For example, if the actuator has a larger modal mass, there can be less separation between the first peak and the second peak. In addition, a shape of each of the peaks can be based on dampening of the fiber scanning system. For example, one of the peaks can be higher than the other peak.

In some examples, the displacement gain of the fiber optic scanning element can be maximized at either the first resonant frequency 552, a fiber natural frequency 556, and/or the second resonant frequency 554. In such examples, the fiber scanning system can be operated at or near the point that is maximizing the displacement gain. In other examples, the fiber scanning system can be operated at one of the points described above, even if the point being operated at is not the maximum. In such examples, the operating point of the fiber scanning system can be selected based on a rate of change around the point. For example, the first resonant frequency 552 and/or the second resonant frequency 554 can be unstable in terms of the displacement gain (e.g., based on an amount of change for the displacement gain in response to small changes to frequency) while the fiber natural frequency 556 can be more stable. In such an example, the fiber natural frequency 556 can be selected as the operating point for the fiber scanning system rather than the first resonant frequency 552 or the second resonant frequency 554.

In some embodiments, the operating point of the fiber scanning system is selected such that the displacement gain is greater than or equal to a predetermined displacement gain. In other words, during operation, the fiber scanning system can achieve a range of displacement gains by driving the actuator at an operating frequency within a range of frequencies.

Referring to FIG. 5B, the displacement gain at the natural frequency of 25 kHz is slightly greater than 40 dB, which can be referred to as the natural displacement gain. Displacement gains greater than or equal to the natural displacement gain can be achieved by driving the fiber scanning system at frequencies (i.e., an operating frequency) ranging from which is associated with the minimum frequency less than first resonant frequency 552 at which the displacement gain equals the natural displacement gain, to $f_2$, which is associated with the maximum frequency greater than second resonant frequency 554 at which the displacement gain equals the natural displacement gain. Accordingly, by driving the fiber scanning system at an operating frequency in this range, a displacement gain greater than or equal to the natural displacement gain is achieved. In some embodiments, a particular operating frequency is selected based on the natural frequency of the actuator whereas in other embodiment, the particular operating frequency is selected based on the natural frequency of the fiber optic scanning element.

The operating frequency can be selected such that the operating frequency is within a threshold of the first resonant frequency 552 or within a threshold of second resonant frequency. The threshold can be set such that the operating frequency is associated with a displacement gain greater than or equal to the natural displacement gain. Accordingly, as illustrated in FIG. 5B, the threshold around the first resonant frequency could extend from frequency $f_1$ to 25 kHZ and the threshold around the second resonant frequency could extend from 25 kHz to frequency $f_2$.

Similar to the fiber plot 550, a piezoelectric tube plot 560 can also include two resonant frequencies. In some examples, the two resonant frequencies of the piezoelectric tube plot 560 can be located at a similar frequency as the two resonant frequencies of the fiber plot 550. However, the displacement gain of the tip of actuator can be reduced to approximately zero. In some examples, combined kinetic and potential energy of the actuator can be transferred to the fiber optic scanning element at the actuator natural frequency, which can cause the displacement gain of the actuator to be reduced to approximately zero.

A second Bode plot can graph a phase angle for an actuator (e.g., a piezoelectric tube plot 520) and a fiber optic scanning element (e.g., a fiber plot 510) in relation to a frequency applied to the piezoelectric tube by a voltage. In some examples, the second Bode plot can illustrate that a phase shift (e.g., a phase shift of 180 degrees) may occur at each peak.

Figure 5C:
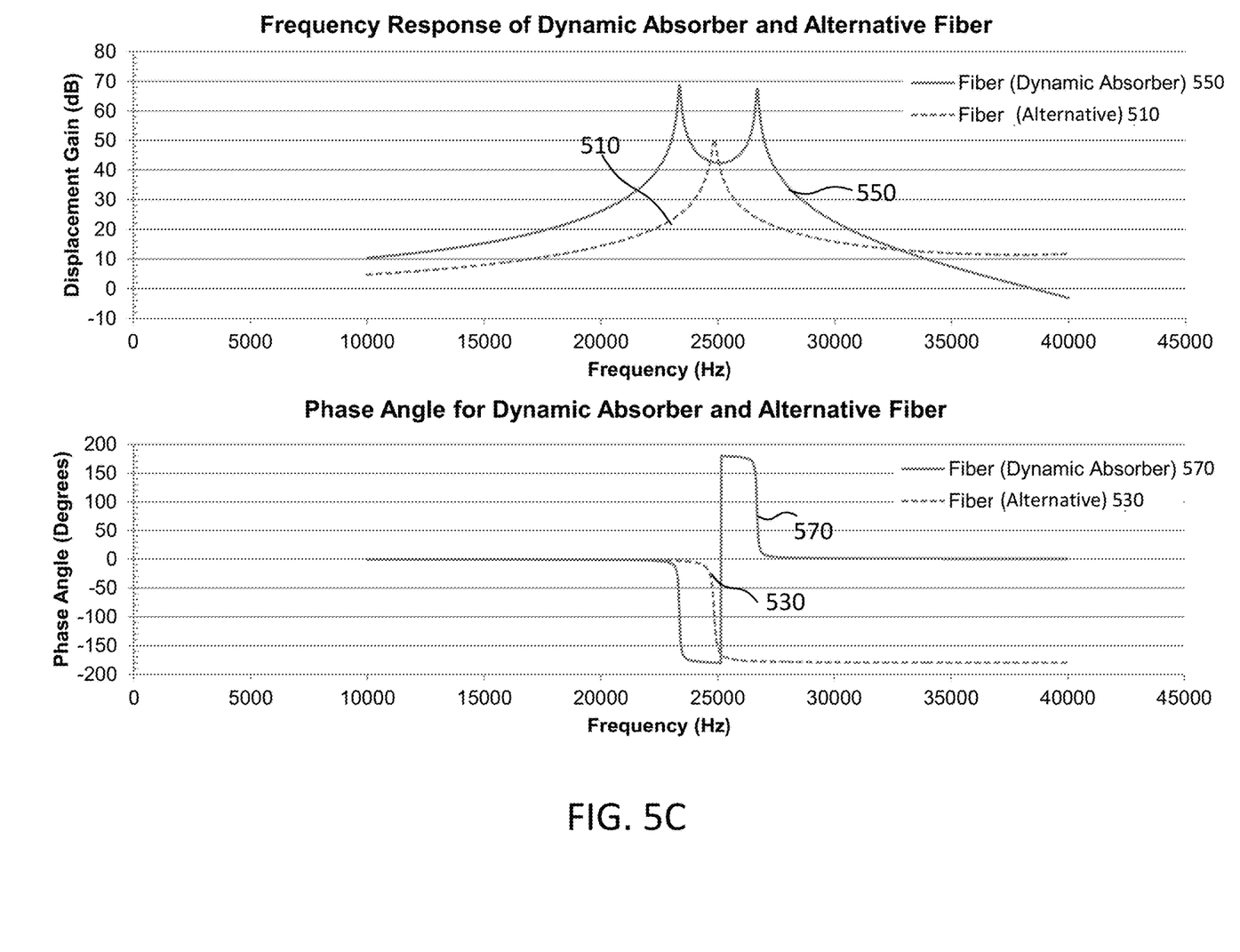
FIG. 5C illustrates an example of Bode plots for a comparison of a dynamic absorption design and an alternative design for a fiber optic scanning element according to embodiments of the present disclosure.

FIG. 5C illustrates an example of Bode plots for a comparison of a dynamic absorption design and an alternative design for a fiber optic scanning element (as described above) according to an embodiment of the present disclosure. As can be seen, the peaks of the fiber optic scanning element for the dynamic absorber design provide the highest displacement gain. And while the displacement gain for the dynamic absorber design at the point between the peaks is lower than the alternative design, this may not always be the case. In addition, even if the dynamic absorber design has a lower displacement gain at that point, the dynamic absorber design may be more stable. The ideal operating point may be determined from experimental studies.

Figure 5D:
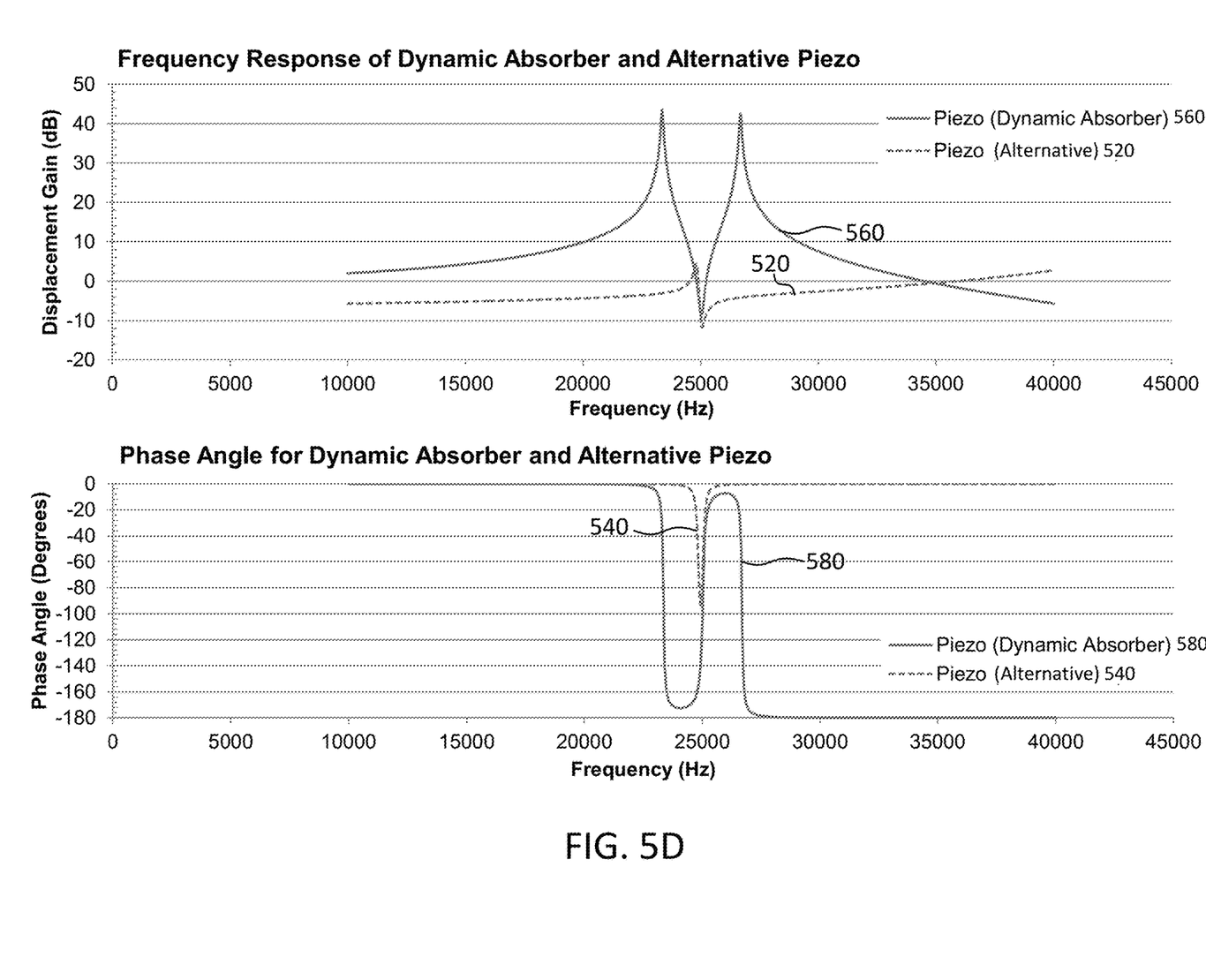
FIG. 5D illustrates an example of Bode plots for a comparison of a dynamic absorption design and an alternative design for an actuator according to embodiments of the present disclosure.

FIG. 5D illustrates an example of Bode plots for a comparison of a dynamic absorption design and an alternative design for an actuator (as described above) according to an embodiment of the present disclosure. In some examples, the example can illustrate that energy is being absorbed from the actuator by the fiber optic scanning element in the dynamic absorption design. In such examples, a response of the actuator may go below a static response for the dynamic absorption design.

Figure 6:
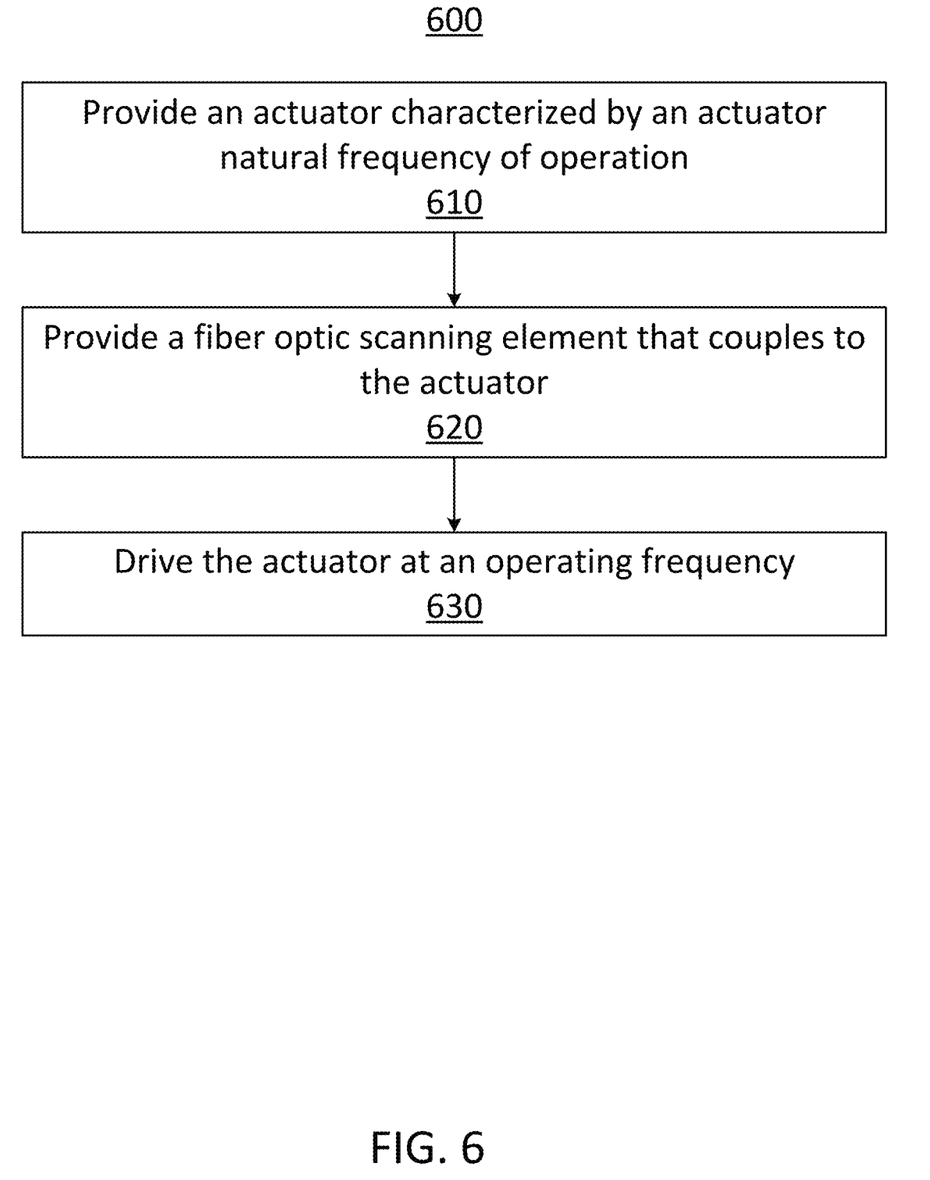
FIG. 6 illustrates an example of a process for increasing the field of view for a fiber scanning system.

FIG. 6 illustrates an example of a process 600 for increasing the field of view for a fiber scanning system.

The process 600 can include providing an actuator characterized by an actuator natural frequency of operation (610). In some examples, the fiber scanning system can include the actuator.

The process 600 can further include providing a fiber optic scanning element coupled to the actuator (620). In some examples, the fiber optic scanning element can be characterized by a fiber natural frequency that is determined to match the actuator natural frequency. In such examples, the fiber scanning system can further include the fiber optic scanning element.

The process 600 can further include driving the actuator at an operating frequency (630). In some examples, a displacement gain of the fiber scanning system can be characterized by two split frequency peaks bounding the actuator natural frequency. In such examples, the operating frequency can be near the first peak of the split frequency peaks (i.e., at a frequency within a threshold of the first peak), where the first frequency peak is less than the actuator natural frequency. In other examples, the operating frequency can be near (i.e., at a frequency within a threshold of the second peak), where the second frequency peak is greater than the actuator natural frequency. In other examples, the operating frequency can be a frequency within a range between the first frequency peak and the second frequency peak, for example, at the actuator natural frequency. In some examples, the actuator can be driven by a sinusoidal voltage.

A number of examples have been described. Nevertheless, it will be understood that various modification may be made without departing from the scope of this disclosure.

What is claimed is:

1. A method for increasing a field of view for a fiber scanning system, the method comprising:
   configuring the fiber scanning system including an actuator and a fiber optic scanning element coupled to the actuator, wherein the fiber optic scanning element is configured to have a fiber natural frequency, the actuator is configured to have an actuator natural frequency, such that the fiber scanning system behaves as a tuned dynamic absorber;
   determining a range of operating frequencies, wherein the range extends from a first operating frequency less than the fiber natural frequency and a second operating frequency greater than the fiber natural frequency; and
   driving the actuator at an operating frequency within the range.

2. The method of claim 1 wherein the fiber natural frequency is substantially matched to the actuator natural frequency.

3. The method of claim 2 wherein a difference between the fiber natural frequency and the actuator natural frequency is less than or equal to about 10% or about 20% of the actuator natural frequency.

4. The method of claim 1 wherein a displacement gain of the actuator is minimized when the actuator is driven substantially at the actuator natural frequency.

5. The method of claim 4 wherein a movement of the actuator is minimized and a movement of the fiber optic scanning element is maximized when the actuator is driven substantially at the actuator natural frequency.

6. The method of claim 1 wherein a first displacement gain is associated with operating the fiber scanning system at the fiber natural frequency.

7. The method of claim 6 wherein determining the range of operating frequencies comprises determining the first operating frequency and the second operating frequency, such that displacement gains of the fiber optic scanning element are greater than or equal to the first displacement gain.

8. The method of claim 6 wherein:
   the operating frequency corresponds to a resonant frequency less than the fiber natural frequency; and
   a displacement gain at the operating frequency is greater than the first displacement gain.

9. The method of claim 6 wherein:
   the operating frequency corresponds to a resonant frequency greater than the fiber natural frequency; and
   a displacement gain at the operating frequency is greater than the first displacement gain.

10. The method of claim 1 wherein the fiber scanning system is characterized by a displacement gain of the fiber optic scanning element as a function of operating frequency that exhibits:
    a first peak value at a first resonance frequency less than the fiber natural frequency; and
    a second peak value at a second resonance frequency greater than the fiber natural frequency.

11. The method of claim 1 wherein a displacement gain of the actuator is reduced to approximately zero when the actuator is driven substantially at the actuator natural frequency.

12. The method of claim 1 wherein the actuator comprises a piezoelectric tube.

13. The method of claim 1 wherein the actuator has a cylindrical geometry having a central axis, and wherein the fiber optic scanning element passes through the actuator along the central axis.

14. The method of claim 1 wherein the fiber optic scanning element comprises a multicore optical fiber.

15. The method of claim 1 wherein the fiber optic scanning element is coupled to the actuator at a central position of the actuator.

16. The method of claim 15 wherein an outside diameter of the fiber optic scanning element is smaller than an inside diameter of the actuator at the central position.

17. The method of claim 16 wherein the fiber scanning system includes a retention collar surrounding and in contact with the fiber optic scanning element.

* * * * *